United States Patent [19]

Grimm et al.

[11] 4,106,093
[45] Aug. 8, 1978

[54] GROUND SPEED DERIVING CIRCUIT

[75] Inventors: Donald K. Grimm, Cedar Rapids, Iowa; Wayne A. Savold, Satellite Beach; Allen R. Walter, Melbourne, both of Fla.

[73] Assignee: Rockwell International Corporation, El Segundo, Calif.

[21] Appl. No.: 809,596

[22] Filed: Jun. 24, 1977

[51] Int. Cl.² .............................................. G06G 7/78
[52] U.S. Cl. .................................. 364/424; 244/182; 343/112 S; 364/451; 364/565; 364/572; 364/825
[58] Field of Search ............... 364/424, 443, 444, 446, 364/449, 451, 460, 825, 829, 572, 565, 830; 343/112 R, 112 C, 112 S; 328/165–167; 340/25, 27 R, 27 NA, 27 SS; 73/178 R; 244/75 R, 76 R, 175, 182

[56] References Cited

U.S. PATENT DOCUMENTS

| | | | |
|---|---|---|---|
| 3,413,597 | 11/1968 | Crow | 364/446 X |
| 3,621,212 | 11/1970 | Hobbs et al. | 343/112 S X |
| 3,686,626 | 8/1972 | Bateman et al. | 340/27 NA |
| 3,757,094 | 9/1973 | Schmitt | 343/112 S X |
| 3,989,208 | 11/1976 | Lambregts | 364/424 X |

Primary Examiner—Joseph F. Ruggiero
Attorney, Agent, or Firm—Richard A. Bachand; H. Fredrick Hamann

[57] ABSTRACT

A circuit for generating a signal proportional to the ground speed and track angle of an aircraft derives a signal from a node in a coherent or vector filter having a position vector input and output. The filter utilizes at least two integrators which integrate respective components of the quadraturized input vector, the outputs of the integrators being added and fed back to the input to be added as an error signal to the input vector. A second filter samples the input to the integrators, and filters the sampled signal to produce a signal proportional to the ground speed of the aircraft.

5 Claims, 1 Drawing Figure

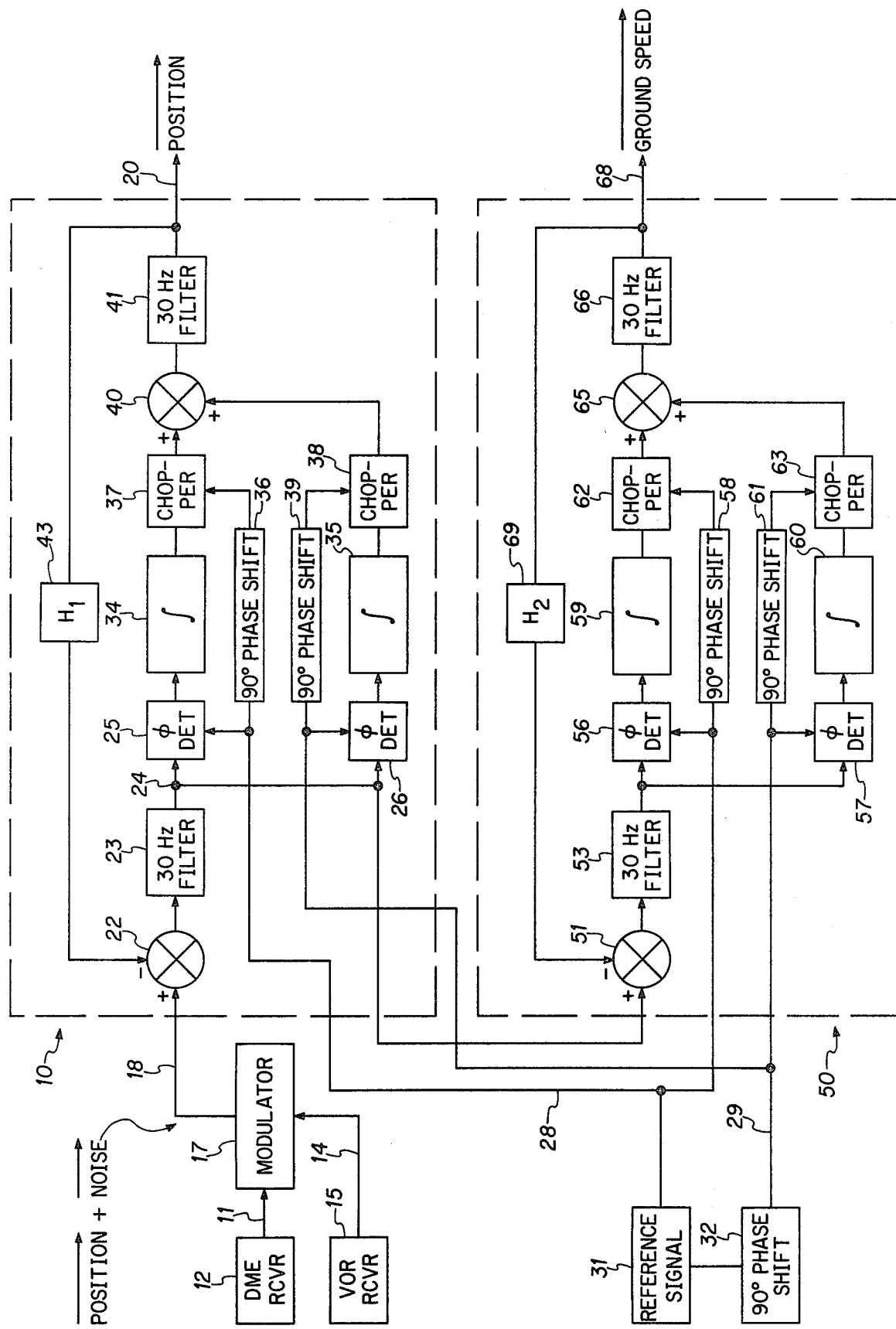

["Ground Speed Deriving Circuit" - patent document]

GROUND SPEED DERIVING CIRCUIT

BACKGROUND OF THE INVENTION

1. Field of the Invention

This invention relates to improvements in aircraft navigational instruments, and more particularly to improvements in aircraft ground speed indicators and circuits for developing ground speed indicating signals.

2. Description of the Prior Art

One of the important navigational aircraft instruments is a ground speed indicator. Ground speed is useful in deriving estimated time of arrival, in calculating speed of head or tail winds, in evaluating aircraft performance, and is often merely of general interest.

Although ground speed is useful, it has heretofore been a measurement which is relatively difficult to obtain. Generally unsatisfactory results have been achieved with prior art analog techniques particularly when using area navigation equipment to travel along paths which do not cross VOR/DME stations. Such techniques typically derive ground speed through the use of an analog differentiator which operates on an appropriate DME signal. Ordinarily, however, such techniques provide correct ground speed only when the course of the aircraft passes directly over the DME station. When the aircraft course is between way points not coinciding with the DME station, the ground speed signal derived typically is only a component of the true ground speed, generally extending in the direction of the DME station. Therefore it can be seen that if the aircraft crosses a radial at right angles to the station, the ground speed may be especially erroneous. The ground speed derived by such analog techniques, therefore, can be used only as a rough estimate, at best.

The prior art includes digital techniques for deriving ground speed, as well. However, many digital systems derive ground speed in a fashion similar to that of the analog techniques described above, providing only a partial component or a rough ground speed estimate. Other sophisticated digital techniques provide true on-course ground speed, but require complicated circuitry, often using "dead reckoning" or "estimated aircraft" positioning techniques.

One common prior art problem is meeting the strict requirements of ground speed deriving circuits. Commonly, DME and VOR signals from which ground speed mesurement is made are highly noisy. The circuitry to handle the signals, nevertheless, has to be linear over a wide range of signal magnitudes. This large linearity requirement is aggravated in great part by the range of the distances over which the DME and VOR signals must be detected and processed, typically over 300 nautical miles. Thus, from a position at the fringes of reception of the DME or VOR signals, having an extremely high noise content, to a location directly over the DME or VOR station, the signal to be processed varies perhaps in orders of magnitude. Consequently, the circuitry may detect large magnitudes of noise which itself may be orders of magnitude larger than the actual velocity/track angle signal content sought. Often times, in fact, computer processing techniques are used to separate the signal from the noise. This large linearity range causes additional problems, especially in the initialization or reinitialization of the ground speed deriving circuit, after, for example, a turn or other disturbing event.

SUMMARY OF THE INVENTION

In light of the above, it is, therefore, an object of the invention to provide an analog circuit for generating a signal proportional to the ground speed of an aircraft from a vector signal representing the position of an aircraft relative to a known point.

It is another object of the invention to provide such circuit which derives a position vector from received VOR and DME signals.

It is another object of the invention to provide such ground speed indicating circuit which can be employed with a typical filter used in position indicating or area navigation instruments.

It is another object of the invention to provide such circuit which can, in addition, provide a signal indicative of the ground track angle of the aircraft.

These and other objects, features, and advantages will become apparent to those skilled in the art from the following detailed description when read in conjunction with the accompanying drawings and appended claims.

The invention, in its broad aspect, presents a circuit for generating a signal proportional to the ground speed of an aircraft from a vector signal representing the position of the aircraft relative to a known point, which may be derived, for example, from signals received from VOR and DME sources. A filter of the type which filters noise from a vector signal via integrator circuits is employed to which the position indicating vector signal is applied, and a second filter derives an input from the first filter prior to the integrator circuit, to produce at its output the desired ground speed indicating signal.

BRIEF DESCRIPTION OF THE DRAWING

The invention is illustrated in the accompanying drawing, wherein FIG. 1, the sole FIGURE, is a schematic box diagram of the ground speed generating circuit in accordance with the invention.

DETAILED DESCRIPTION OF THE PREFERRED EMBODIMENTS

The ground speed indicating circuit of the invention, in a preferred embodiment, is constructed basically utilizing a coherent filter, indicated generally by the reference numeral 10. Such coherent filter can be constructed in accordance with that described in U.S. Pat. No. 3,833,855, by M. W. Lundgreen, said patent being assigned to the assignee of the present invention, and incorporated herein by reference.

The input to the filter 10 is derived from an output 11 of a standard DME receiver 12, and the output 14 of a standard VOR receiver 15. The outputs 11 and 14 are applied to a modulator 17 to produce at its output 18 a position vector, the amplitude, $\rho$, representing the distance from the DME station and phase, $\theta$, representing the angle from north determined by the signal from the VOR station. Thus, the modulator output 18 produces a signal herein referred to as a $\rho$, $\theta$ vector indicating the instantaneous position of the aircraft. It will be recognized, however, that in addition to the desired $\rho$, $\theta$ information, a considerable amount of noise may exist on the signal. The filter 10, as described in said U.S. Pat. No. 3,833,855, serves to filter the noise component of the $\rho$, $\theta$ signal to produce at the output 20 a position indicating vector signal for driving a cockpit display or other purpose.

Although the fabrication and operation of the filter 10 is explained in detail in said U.S. Pat. No. 3,833,855, briefly, its operation is as follows. The $\rho$, $\theta$ signal 18 is applied to a subtractor 22, and the output 20 of the filter 10 is subtracted from it. The signal is then applied to a 30 Hz filter 23, the output 24 of which is quadraturized by phase detectors 25 and 26 to produce outputs representing, respectively, north and east components of the signal. The reference signals against which the phase comparisons in phase detectors 25 and 26 are made are derived from outputs 28 and 29, respectively, of a frequency reference source 31 and a 90° phase shifter 32. The east component of the signal, therefore, is displaced in phase 90° from the north component. In addition, the reference signals are each shifted an additional 90° in respective phase shifters 36 and 39 for application to chopper circuits 37 and 38, as will presently be described.

The north and east components are then separately integrated in respective integrator circuits 34 and 35, chopped in chopper circuits 37 and 38 in accordance with the 90° phase shifted reference signal 28 and the 180° phase shifted signal 29, and finally added in an adder 40. The output from the adder 40 is again filtered in a 30 Hz filter 41, the output of which determines the position vector 20. The output 20 is additionally fed back to the subtractor 22, as mentioned above, and modified by a factor $H_1$ in an amplifier section 43. Thus, by control of the various characteristics of the respective circuits, the filter 10 can accurately remove most of the noise component from the $\rho$, $\theta$ input signal 18.

The circuit, in accordance with the invention, recognizes that since an output vector 20 is derived from the filter 10, and, in its derivation, was integrated by respective integrators 34 and 35, the input signal to the integrators 34 and 35 must represent a velocity signal, or a differentiated position signal. Thus, the input 24 to the integrators 34 and 35 is tapped prior to being quadratured and applied to a second filter 50, also fabricated in accordance with said U.S. Pat. No. 3,833,855. The signal 24 is applied to a subtractor 51, the output of which is filtered in a 30 Hz filter 53. The output of the filter 53 is again quadraturized by phase detectors 56 and 57 in accordance with the respective reference signals 28 and 29. The outputs of the phase detectors 56 and 57 are applied to integrators 59 and 60 to produce outputs which, after being chopped by chopper circuits 62 and 63, also controlled by the respective reference signals 28 and 29, each delayed by respective 90° phase shifter circuits 58 and 61, are added in an adder 65. The output of the adder 65 is filtered again in 30 Hz filter 66 to produce an output 68 proportional directly to the ground speed of the aircraft. The output 68 is fed back to the subtractor 51 by an amplifier 69 having a transfer characteristic $H_2$.

It should be noted that since the signal 24 within the filter 10 is proportional to both phase and magnitude error, i.e. a vector signal, the aircraft with which the circuit is associated need not be flying directly toward the station from which its signal is derived, but may be flying in any direction to thereby provide an indication of the actual ground speed of the aircraft, not merely a component thereof, regardless of the angle that the aircraft is flying with respect to the station.

It will be recognized that the position rate vector signal 24 may contain a differentiated random noise vector existing on the input signal 18. Since a differentiation greatly exaggerates randomly changing noise signals, the velocity vector to be utilizable may require a considerable amount of filtering. The time constant, therefore, of the filter 50 must therefore be large enough to average out the large random noise vector. It has been found, for example, that a filter time constant of between about one to 5 minutes in ordinary flight modes produces satisfactorily accurate ground speed readings. In approach modes, the time constant can be reduced for more rapid response, if desired.

It should be pointed out that although the derived ground speed is independent of aircraft track, if a large heading change is made, the ground speed producing circuit will require some time to settle out, the precise time being a function of the rate of turn and magnitude of the heading change.

It should be particularly pointed out that the output of the second coherent filter 50 is a vector signal. The magnitude of this signal, as above described, represents the ground speed of the aircraft. The angle of this signal represents the ground track angle, and may also be of interest in many applications.

Although the invention has been described and illustrated with a certain degree of particularity, it is understood that the present disclosure has been made only by way of example and that numerous changes in the combination and arrangement of parts may be resorted to without departing from the spirit and scope of the invention as hereinafter claimed.

We claim:

1. A circuit for generating a signal proportional to the ground speed of an aircraft from a vector signal representing the position of the aircraft relative to a known point, comprising:

a first filter for filtering noise from the vector signal to produce a position indicating output signal, and which includes a summing circuit having a negative input and having a negative input and having a positive input to which the vector signal is applied, said summing circuit being operative to generate a difference output signal, an integrator having an input connected to receive the difference signal, and a feedback path connected between an output of the integrator and the negative input of the summing circuit, and a second filter which derives an input from said first filter between said subtractor and said integrator circuit to produce a signal proportional to the ground speed of the aircraft.

2. The circuit of claim 1 wherein the vector signal is derived from the outputs of a DME receiver and a VOR receiver, the amplitude representing distance from, and the phase representing a relative ground track angle with respect to, the known point.

3. A circuit for generating a signal proportional to the ground speed and ground track angle of an aircraft from a vector signal representing the position of the aircraft relative to a known point, comprising:

A. a first filter having an input to which said vector signal is applied and a position indicating output, including:
   1. means for separating said vector signal into first and second signal components,
   2. first and second integrators for respectively integrating the first and the second signal components,
   3. means for adding the integrated signal components to constitute the position indicating output, 4. means for feeding back the position indicating output to the input of said first filter, B. and a second filter having an input connected to sample an input to said integrators to produce a signal proportional to the ground speed of the aircraft.

4. The circuit of claim 3 wherein said first and second filters are coherent filters.

5. The circuit of claim 4 wherein said second filter has a time constant of between about 2 and about 5 minutes.

* * * * *